(12) United States Patent
Jung et al.

(10) Patent No.: US 11,361,402 B2
(45) Date of Patent: Jun. 14, 2022

(54) ELECTRONIC DEVICE AND METHOD FOR SAVING IMAGE

(71) Applicant: Samsung Electronics Co., Ltd., Gyeonggi-do (KR)

(72) Inventors: Bongsoo Jung, Gyeonggi-do (KR); Changho Kim, Gyeonggi-do (KR); Janghee Ryu, Gyeonggi-do (KR); Seonghwan Kim, Gyeonggi-do (KR); Byeongdoo Ahn, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/149,826

(22) Filed: Jan. 15, 2021

(65) Prior Publication Data
US 2021/0248710 A1    Aug. 12, 2021

(30) Foreign Application Priority Data
Feb. 7, 2020    (KR) ........................ 10-2020-0014727

(51) Int. Cl.
*G06T 1/60*    (2006.01)
*G06T 9/00*    (2006.01)

(52) U.S. Cl.
CPC . *G06T 1/60* (2013.01); *G06T 9/00* (2013.01)

(58) Field of Classification Search
CPC ..................................................... G06T 1/60
See application file for complete search history.

(56) References Cited

U.S. PATENT DOCUMENTS

| | | | |
|---|---|---|---|
| 2013/0234964 A1 | 9/2013 | Kim et al. | |
| 2014/0313320 A1 | 10/2014 | Kikuchi | |
| 2017/0118540 A1 | 4/2017 | Thomas et al. | |
| 2018/0124462 A1 | 5/2018 | Lim et al. | |
| 2019/0246116 A1 | 8/2019 | Auyeung et al. | |
| 2019/0364289 A1* | 11/2019 | Hattori | H04N 19/188 |
| 2020/0333993 A1* | 10/2020 | Yoshimochi | H04N 21/4331 |

FOREIGN PATENT DOCUMENTS

| | | |
|---|---|---|
| KR | 10-0683349 B1 | 2/2007 |
| KR | 10-2017-0005366 A | 1/2017 |
| KR | 10-2030754 B1 | 10/2019 |
| WO | 2019/093072 A1 | 10/2020 |

OTHER PUBLICATIONS

International Search Report dated Apr. 16, 2021.

* cited by examiner

*Primary Examiner* — Shivang I Patel
(74) *Attorney, Agent, or Firm* — Cha & Reiter, LLC

(57) ABSTRACT

Provided is an electronic device. The electronic device may include: a display; a processor operatively connected to the display; and a memory operatively connected to the processor, wherein the memory may store instructions that, when executed, cause the processor to: display an image on the display; identify tiles corresponding to at least a region of the image selected as a region of interest; select the identified tiles from a file in which the image is stored; and store at least one piece of information on the region of interest, and the selected tiles, wherein the file in which the image is stored may be a file in which the image is compressed and stored as a plurality of tiles. It is also possible to provide various other embodiments.

18 Claims, 12 Drawing Sheets

FIG. 3

|   | 0 | 1 | 2 | 3 | 4 | 5 | 6 | 7 |
|---|---|---|---|---|---|---|---|---|
| 0 | 0 (0,0) | 1 | 2 | 3 | 4 | 5 | 6 | 7 |
| 1 | 8 | 9 | 10 | 11 | 12 | 13 | 14 | 15 |
| 2 | 16 | 17 | 18 | 19 | 20 (4,2) | 21 | 22 | 23 |
| 3 | 24 | 25 | 26 | 27 | 28 | 29 | 30 | 31 |
| 4 | 32 | 33 | 34 | 35 | 36 | 37 | 38 | 39 |
| 5 | 40 | 41 | 42 | 43 | 44 | 45 | 46 | 47 (7,5) |

300

310

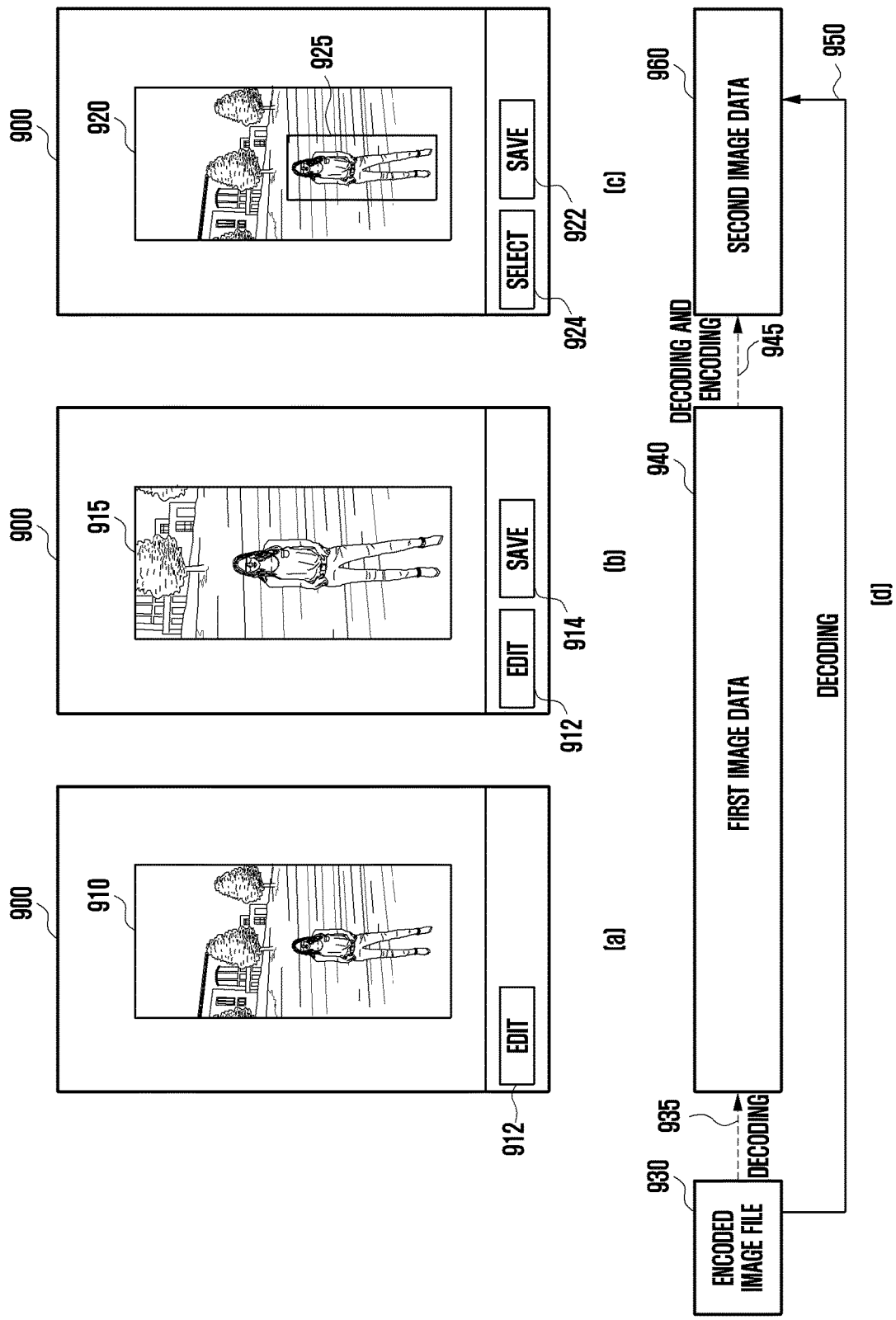

ELECTRONIC DEVICE AND METHOD FOR SAVING IMAGE

CROSS-REFERENCE TO RELATED APPLICATION

This application is based on and claims priority under 35 U.S.C. § 119 to Korean Patent Application No. 10-2020-0014727 filed on Feb. 7, 2020, in the Korean Intellectual Property Office, the disclosure of which is herein incorporated by reference in its entirety.

BACKGROUND

Field

One or more embodiments of the instant disclosure generally relate to an electronic device and method for storing images.

Description of Related Art

Recently, cameras and related technologies have advanced. As the number of pixels that can be obtained by cameras have increased rapidly, various applications and services utilizing high-resolution images or videos (e.g., 4K or 8K HEVC video and HEIC image) are being developed. For example, there may exist in the art an application capable of capturing high-quality image or video that can be displayed on a large screen by using a camera installed on an electronic device.

SUMMARY

As mentioned above, in recent years, electronic devices that are able to take ultra-high resolution images have been developed. To extract a region of interest from an ultra-high resolution image, memory space is required for storing the decoded data and the extracted data and additional image encoding is required, so a large amount of memory and computation may be required. In particular, even when the image in question is encoded as a number of tiles, if the size of the region of interest is very large, large memory space may still be required even with partial decoding. Additionally, large amount of computation may be required in the re-encoding process.

According to an embodiment of the disclosure, there is provided an electronic device. The electronic device may include: a display; a processor operatively connected to the display; and a memory operatively connected to the processor, wherein the memory stores instructions that, when executed, cause the processor to: display an image on the display; identify tiles corresponding to at least a region of the image selected as a region of interest; select the identified tiles from a file in which the image is stored; and store at least one piece of information on the region of interest and the selected tiles, wherein the file in which the image is stored is a file in which the image is compressed and stored as a plurality of tiles.

According to an embodiment of the disclosure, there is provided an electronic device. The electronic device may include: a display; and a processor operatively connected to the display, wherein the processor is configured to: display an image on the display; identify tiles corresponding to at least a region of the image selected as a region of interest; identify a size of the region of interest based on the identified tiles; determine whether the size of the region of interest is greater than a preset threshold value; and store, in case that the size of the region of interest is less than the preset threshold value, the region of interest by using a decoded image corresponding to the region of interest.

According to an embodiment of the disclosure, there is provided a method for an electronic device to store a region of interest of an image. The method may include: displaying the image on a display; identifying tiles corresponding to at least a region of the image selected as the region of interest; selecting the identified tiles from a file in which the image is stored; and storing at least one piece of information on the region of interest and the selected tiles, wherein the file in which the image is stored is a file in which the image is compressed and stored as a plurality of tiles.

Additional aspects will be set forth in part in the description which follows and, in part, will be apparent from the description, or may be learned by practice of the presented embodiments.

BRIEF DESCRIPTION OF THE DRAWINGS

The above and other aspects, features and advantages of certain embodiments of the disclosure will be more apparent from the following detailed description, taken in conjunction with the accompanying drawings, in which the same or similar reference symbols may be used to refer to the same or like parts, and in which:

FIG. 3 is a diagram illustrating a configuration of the main image according to an embodiment;

FIG. 9 illustrates a user interface and corresponding functions of the electronic device according to an embodiment of the disclosure.

DETAILED DESCRIPTION

Hereinafter, certain embodiments of the disclosure will be described in detail with reference to the accompanying drawings.

Certain embodiments of the disclosure may provide an electronic device and method for extracting and storing a selected region, that is, a region of interest from a high-resolution and/or high-capacity image.

According to an embodiment of the disclosure, the electronic device may extract and store a selected region of an image at high speed without encoding and decoding operations.

According to an embodiment of the disclosure, the electronic device may extract and store a selected region of an ultra-high resolution image by using only a small amount of memory.

Figure 1:
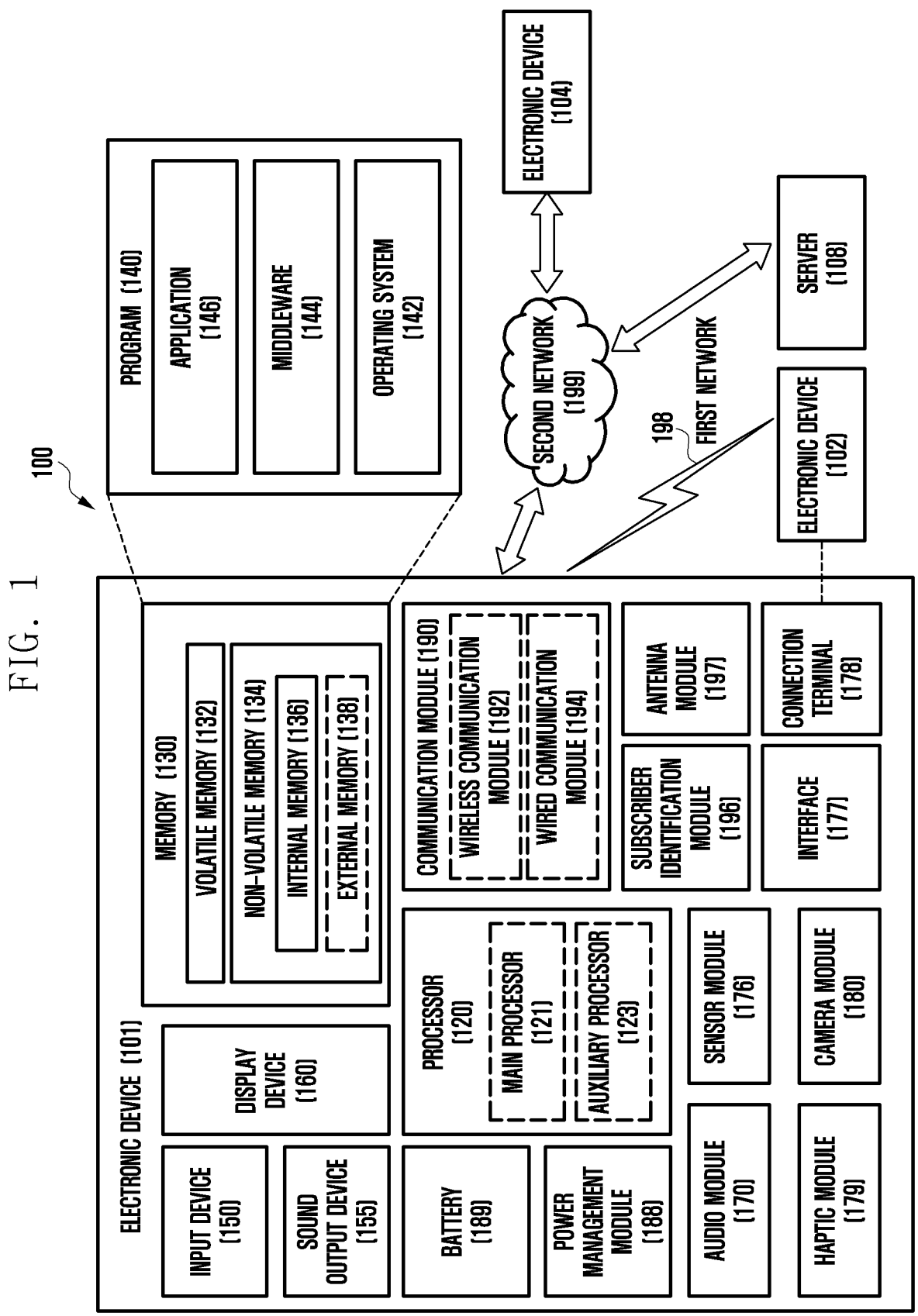
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 2:
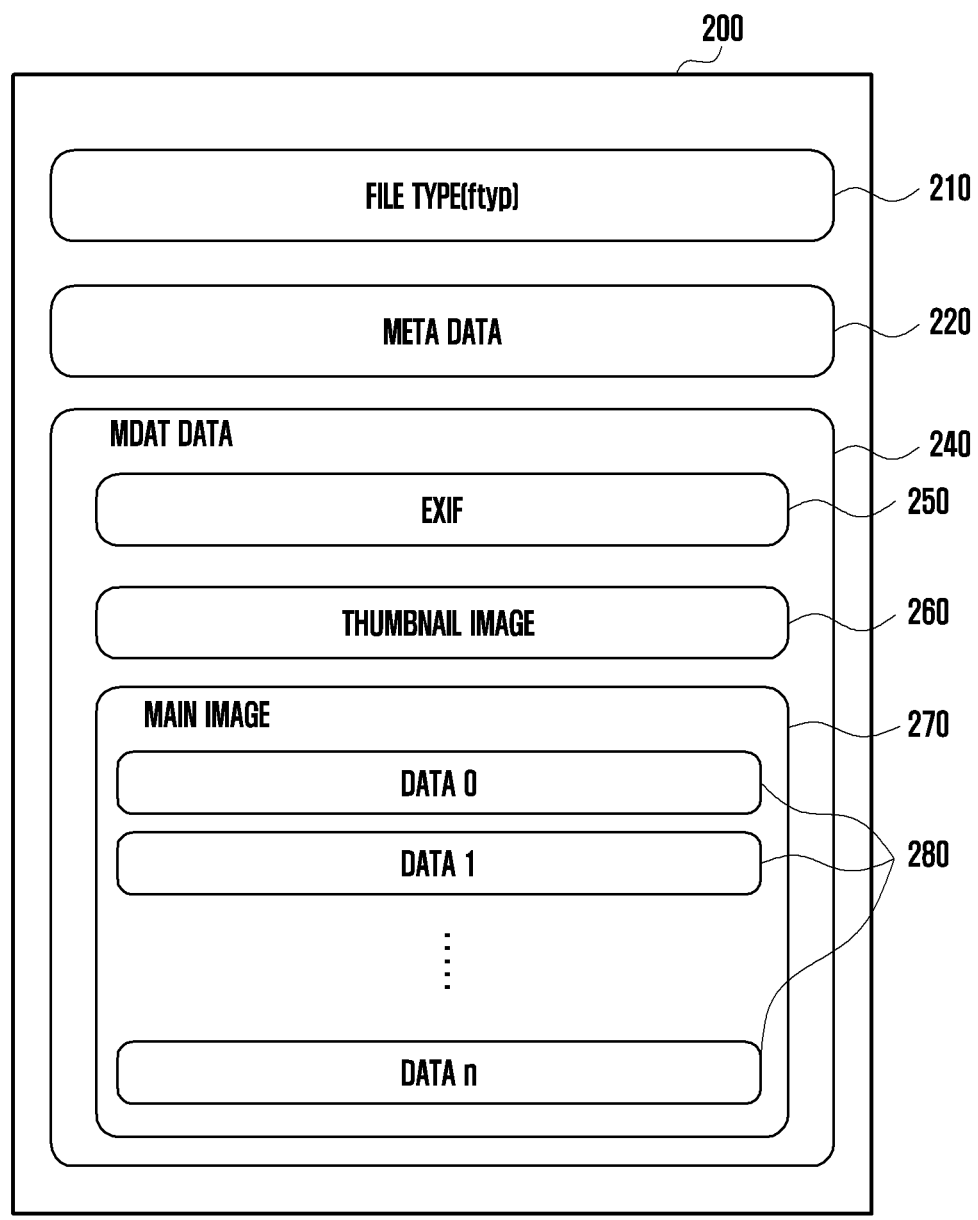
FIG. 2 is a block diagram illustrating the structure of an image file according to an embodiment.

FIG. 2 is a block diagram illustrating the structure of an image file according to an embodiment.

With reference to FIG. 2, the image file 200 may include data fields such as file type (ftyp) 210, metadata 220, and mdat data 240. The image file 200 may include a compressed image, and a HEIF (high efficiency image format) image compression technique based on HEVC (high efficiency video coding) video compression may be used for example. The HEVC encoder may divide an image into a plurality of tiles, and each tile may be a rectangular region of the image having a specified size. The plurality of tiles may be independently searched and/or decoded without having to refer to each other. The HEIF image may include image data encoded in units of tiles and information on the tiles.

The file type (ftyp) 210 may include the brand name of an image file format. For example, if the file type 210 is a high efficiency image container (HEIC), this indicates that the coding format of the image file is high efficiency video coding (HEVC) and the image file 200 contains an image that is not in a sequence.

The metadata 220 may include header data of the image. For example, the size of the main image, the size of a tile, and the number of tiles may be included in the header data. Here, the main image is the image of the image file, and may be that image for display on a display part such as a screen. In addition to the main image, the image file may also include a thumbnail image described below.

The mdat data 240 may include an exchangeable image file format (EXIF) 250, thumbnail image 260, and main image 270.

The EXIF 250 may include supplementary information about the image (e.g., manufacturer of the camera used to photograph the image, and the date the image was photographed, etc.).

The thumbnail image 260 may be an image representing the image file 200. The thumbnail image 260 may be a small and simplified version of the main image. The thumbnail image 260 may be stored in a compressed format. Information about the offset indicating the location of the thumbnail image 260 may be included in the metadata 220.

The main image 270 is the image to be displayed using the image file, and may be stored in a compressed format like the thumbnail image 260. The main image may include a plurality of tiles. The main image may include pieces of data 280 corresponding to the individual tiles. The data 280 corresponding to the tiles may be encoded data. Information about the offset of each tile may be included in the metadata 220. When information on the offset of a tile included in the metadata 220 is used, the electronic device (e.g., electronic device 101 in FIG. 1) may randomly access a specific tile.

FIG. 3 is a diagram illustrating a configuration of the main image according to an embodiment.

In an embodiment, the main image 300 included in the image file may be represented using a plurality of tiles, including a particular tile 310. In various embodiments of the disclosure, a particular tile 310 may be referred to as a block, a grid, or a coding unit. The tile 310 may be a unit that can be independently processed by the electronic device (e.g., electronic device 101 in FIG. 1) without referring to another tile. The tile 310 may be independently compressed and stored because there is no dependency between tiles. The plurality of tiles included in one image file may all have the same size. When tiles of different sizes are included in one image file, information on the size of the tiles may be further included in the header data. The tiles may be different in terms of size and resolution for different image files. The tile 310 may be addressed or indicated by an index (e.g., 0, 1, 2) or may be addressed or indicated by coordinates (e.g., (0, 0), (0, 1), (1, 0)).

For example, FIG. 3 shows a main image composed of a total of 48 tiles. In FIG. 3, the tile with the index of 20 may also be indicated by the coordinate value of (4, 2).

Figure 4:
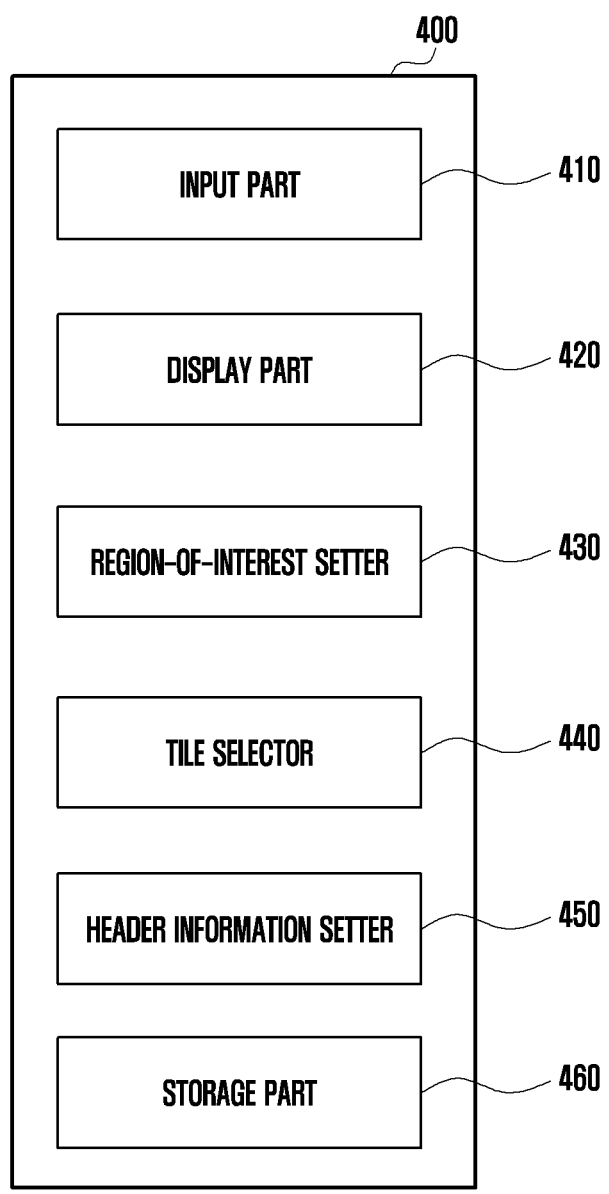
FIG. 4 is a functional block diagram of an electronic device according to an embodiment of the disclosure.

FIG. 4 is a functional block diagram of an electronic device according to an embodiment of the disclosure.

In an embodiment of the disclosure, the electronic device 400 may include an input part 410, a display part 420, a region-of-interest setter 430, a tile selector 440, a header information setter 450, and a storage part 460.

In an embodiment of the disclosure, the input part 410 may receive an input from the user to select an image. For example, the user may select a single image from an application. Or, the user may search the Internet for images and select and download a specific image. Hereinafter, the image input by the user through the input part 410 may be referred to as an "original image" or an "original image file" to distinguish it from an image selected as a region of interest.

In an embodiment of the disclosure, the display part 420 may correspond to the display device 160 in FIG. 1. The display part 420 may display an original image and/or an image selected as a region of interest. In various different embodiments of the disclosure, the input part 410 and the display part 420 may be integrally implemented, in which case it can be referred to as a touch screen display.

In an embodiment of the disclosure, the region-of-interest setter 430, which may be implemented as software executed by the processor of the electronic device 400, may select an image (e.g. a portion of the original image) displayed on the display part 420 as a region of interest. The electronic device 400 may select a region of interest when a specific action of the user is identified. For example, when the image displayed on the display part 420 is enlarged or reduced, the electronic device 400 may determine that a region of interest is selected. The region of interest may be selected by using, for example, an editing application or a viewer application. Selection of a region of interest using an application may be described in detail with reference to FIG. 9 below. The processor of the electronic device may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

In an embodiment of the disclosure, the region-of-interest setter 430 may identify the index and/or coordinate value of the corresponding tile (e.g., tile 310 in FIG. 3) by checking the coordinate values of the pixels corresponding to the region of interest. The region-of-interest setter 430 may determine whether a tile 310 is included in part or in whole in the region of interest. The region-of-interest setter 430 may identify a tile 310 that is included in part or in whole in the region of interest as a tile corresponding to the region of interest.

In an embodiment of the disclosure, the tile selector 440, which may be implemented as software executed by the processor of the electronic device 400, may select a tile 310 corresponding to the region of interest. The tile selector 440 may select the tile 310 identified by the region-of-interest setter 430 from the original image file (e.g., main image 270 in FIG. 2).

In an embodiment of the disclosure, the header information setter 450, which may be implemented as software executed by the processor of the electronic device 400, may store information about the region of interest such as the size of the region of interest as header data. For example, the information about the region of interest may include information on the total number of tiles, the size of the tiles, and/or the resolution of the tiles. As the resolution of the tile identified as corresponding to the region of interest may be higher than that of the selected region of interest, the resolution of the identified tile may also be included in the information on the region of interest. The header information setter 450 may further store information related to the region of interest among the information about the original image as header data. For example, the information about the original image may include information regarding the generation time of the original image and the device used to generate the original image.

In an embodiment of the disclosure, the storage part 460 may store header data saved by the header information setter 450 and the tile 310 selected by the tile selector 440 as a separate image file. The storage part 460 may be directly accessed to select the original image file and to extract the tile 310 corresponding to the region of interest. The storage part 460 may be accessed to extract the region of interest from the original image file without decoding or encoding of the original image file. And the extracted region of interest may be stored as a separate image file together with the header data saved by the header information setter 450. For example, the processor of the electronic device 400 may access the storage part 460 to modify the index of a tile corresponding to the region of interest and store it as a separate image file.

In an embodiment of the disclosure, the storage part 460 may be accessed to add or update the header data saved by the header information setter 450 to the original image file. The storage part 460 may also be accessed to update the thumbnail image.

In an embodiment of the disclosure, the image file storing the region of interest may have the same resolution as the original image file.

Figure 5A:
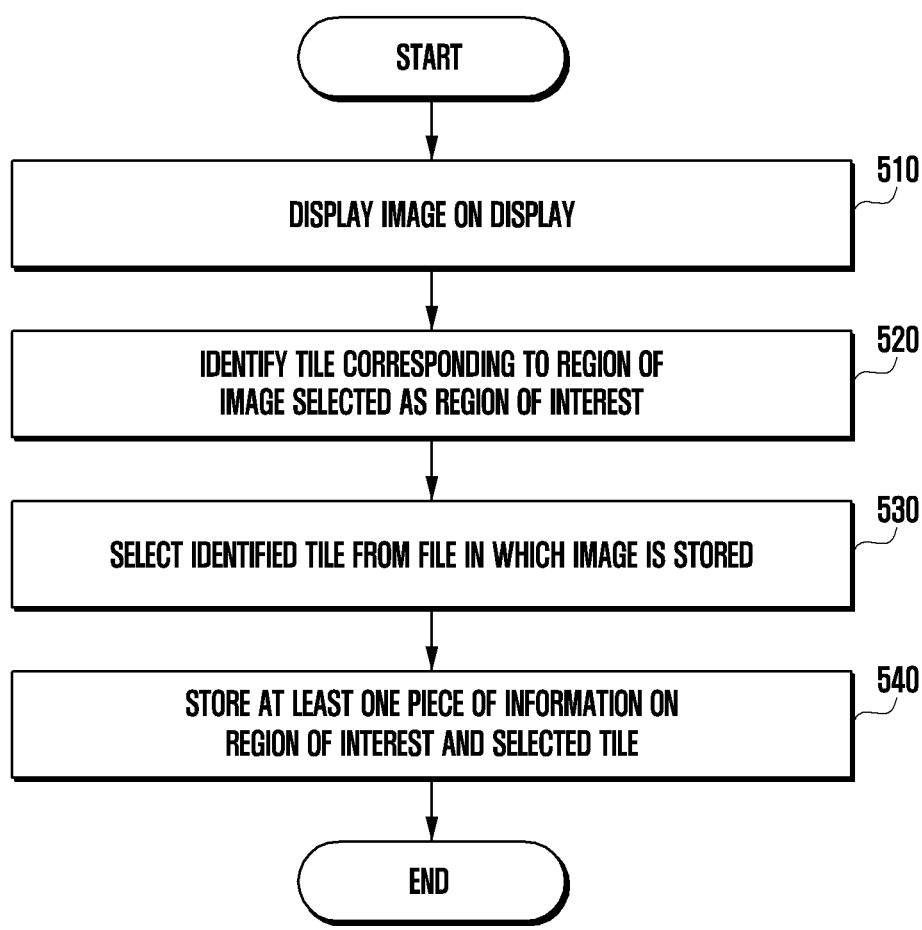
FIG. 5A is a flowchart illustrating operations of the electronic device according to an embodiment of the disclosure.

FIG. 5A is a flowchart illustrating operations of the electronic device according to an embodiment of the disclosure.

In an embodiment of the disclosure, at operation 510, the electronic device (e.g., electronic device 400 in FIG. 4) may display an image on the display part (or, display) (e.g., display part 420 in FIG. 4). The image file containing the image may be a compressed file. The electronic device 400 may additionally perform a decoding operation to display the image file.

In an embodiment of the disclosure, a region of the image may be selected as a region of interest by the electronic device 400 or the user. In the following description, the image before the region of interest is selected may be referred to as an "original image" or an "original image file" to distinguish it from the image selected as the region of interest. In various different embodiments of the disclosure, the region of interest may be selected by the user using a viewer application (e.g., gallery) or an editing application (e.g., image editor).

In an embodiment of the disclosure, the viewer application or the editing application may be separate applications or may be a single application having various functions (e.g., viewer function and editing function).

In an embodiment of the disclosure, at operation 520, the electronic device 400 may identify a tile corresponding to the region of the image selected as the region of interest. The electronic device 400 may identify a corresponding tile by checking coordinate values of pixels corresponding to the region of interest against the coordinate values of the tiles.

The electronic device 400 may determine whether a tile is included in part or in whole in the region of interest. If a tile is included in part or in whole in the region of interest, the electronic device 400 may determine that the tile is a tile included in the region of interest.

In an embodiment of the disclosure, the electronic device 400 may further identify additional data such as the indexes of tiles corresponding to the region of interest, the total number of tiles, coordinate values of the tiles, the size of the region of interest, or the total size of tiles corresponding to the region of interest. For example, the electronic device may identify tile indexes corresponding respectively to an upper left and a lower right of the region of interest.

In an embodiment of the disclosure, at operation 530, the electronic device 400 may select the identified tile from the file in which the image is stored. The electronic device 400 may select the tile from the file in which the image is stored, that is, the original image file by using the index or coordinate value of the tile corresponding to the region of interest. The electronic device 400 may use information on the indexes or coordinate values and the offsets of tiles from the original image file to select the identified tile. Information about the tile offset may be included in the metadata (e.g., metadata 220 in FIG. 2) of the original image file.

In an embodiment of the disclosure, at operation 540, the electronic device 400 may store at least one piece of information on the region of interest and the selected tile. The electronic device 400 may include at least one piece of information on the region of interest in the header data and store it together with the selected tile. In an embodiment of the disclosure, the electronic device 400 may change some information (e.g., size of the region of interest) of the header data of the original image file and store it together with the selected tile.

Figure 5B:
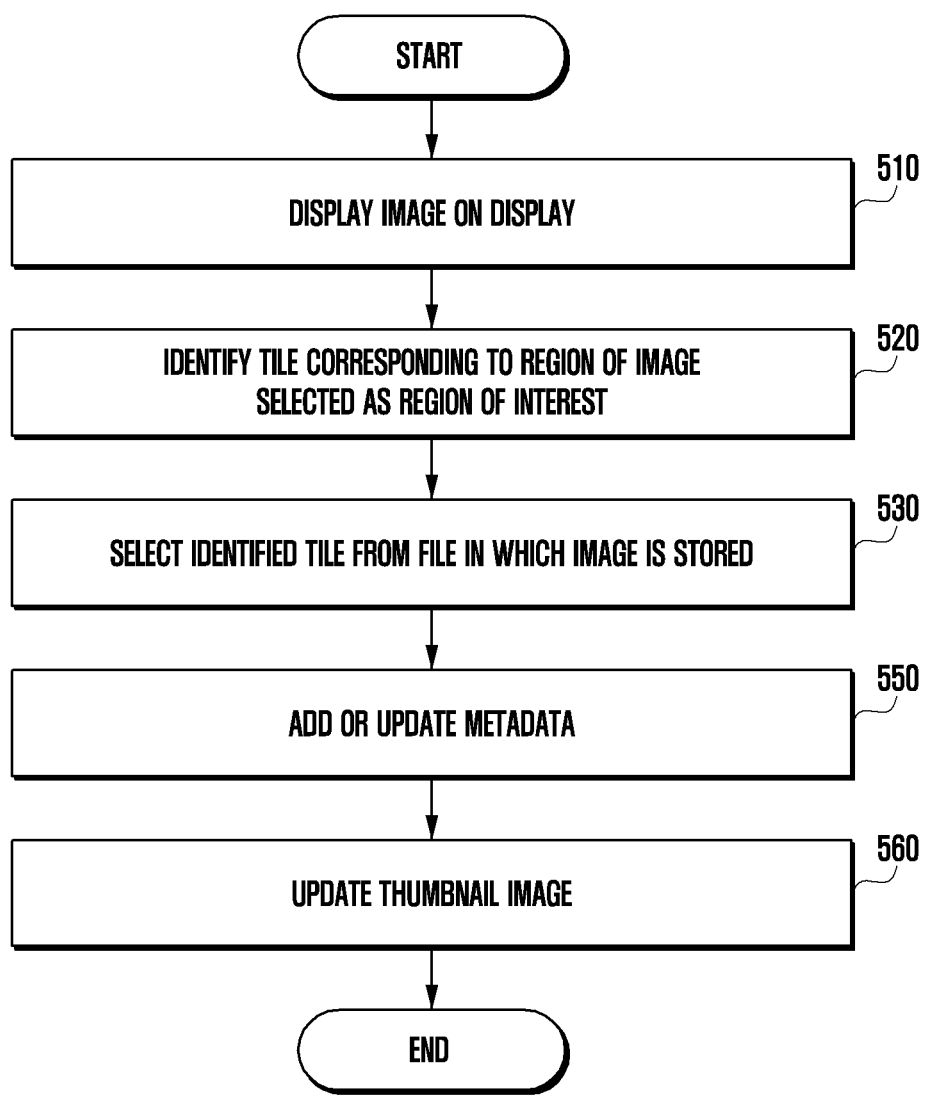
FIG. 5B is a flowchart illustrating operations of the electronic device according to another embodiment of the disclosure.

FIG. 5B is a flowchart illustrating operations of the electronic device according to another embodiment of the disclosure.

In an embodiment of the disclosure, FIG. 5B may show an example for supporting compatibility of an image file when sharing of the image file is required or when there is a performance issue in the electronic device.

In an embodiment of the disclosure, operations 510 to 530 may be the same as those of FIG. 5A, and a description thereof are omitted herein.

In an embodiment of the disclosure, at operation 550, the electronic device 400 may add or update metadata. The electronic device 400 may add or update at least one piece of information about the identified region of interest and/or at least one piece of information about the tile corresponding to the identified region of interest to the metadata of the original image file. For example, information such as information related to the size of the region of interest, the date of selecting the region of interest, the index of the tile corresponding to the region of interest, and/or the number of tiles may be added or updated to the metadata.

In an embodiment of the disclosure, when there is added metadata, the electronic device 400 may display an image corresponding to information included in the added metadata on the display.

In an embodiment of the disclosure, at operation 560, the electronic device 400 may update the thumbnail image. The electronic device 400 may update the thumbnail image of the original image file to correspond to the selected region of interest.

Figure 6A:
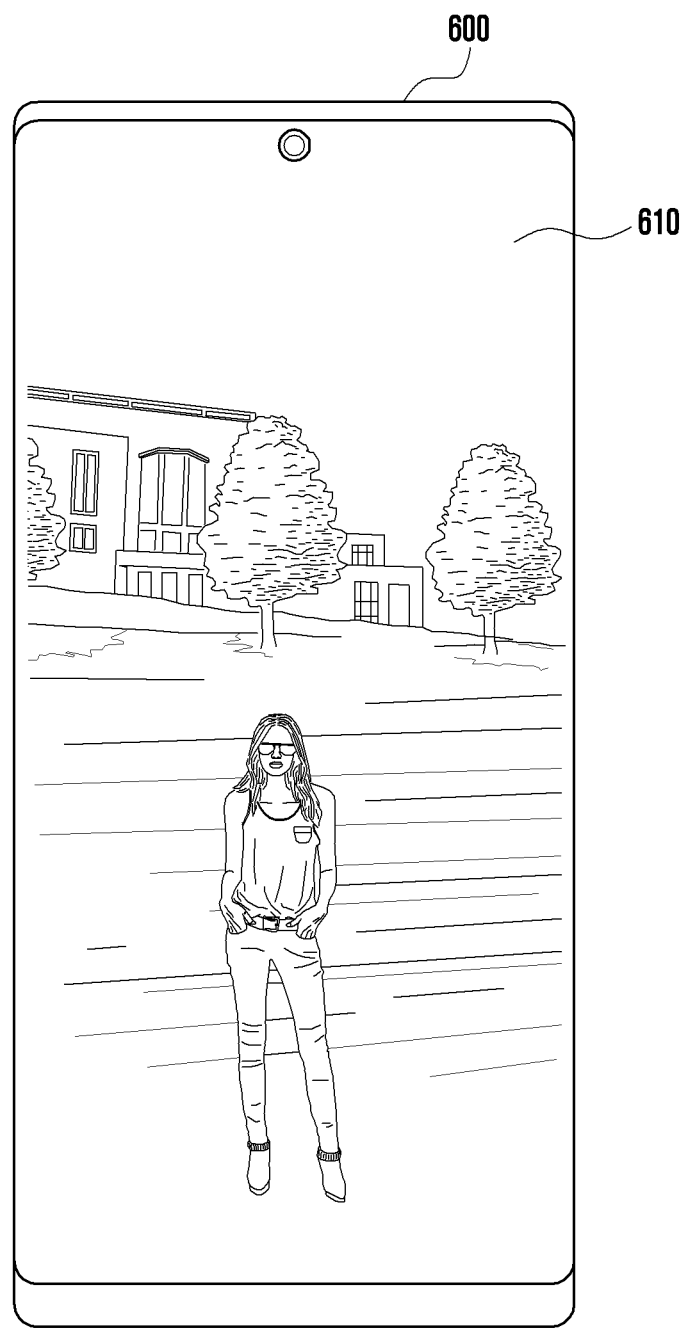
FIGS. 6A to 6C illustrate an example in which the electronic device extracts and stores a region of interest of an image according to an embodiment of the disclosure.
Figure 6B:
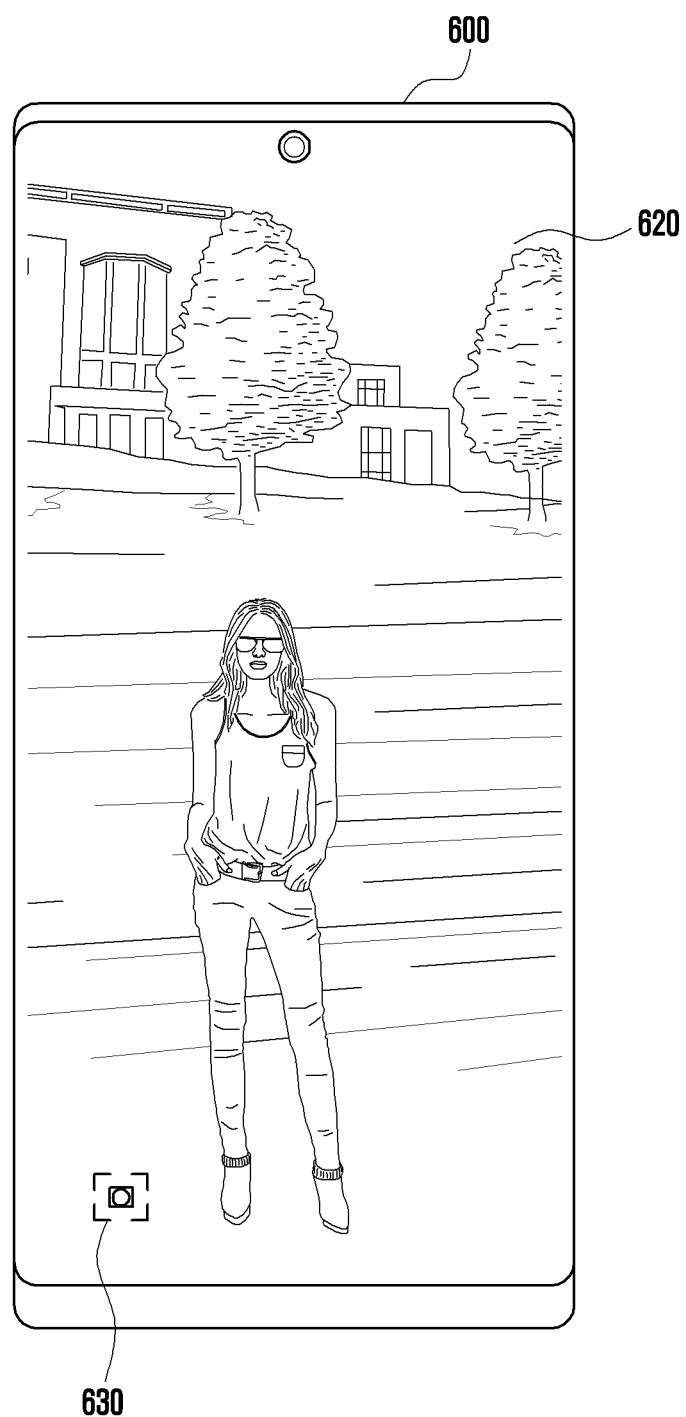
Figure 6C:
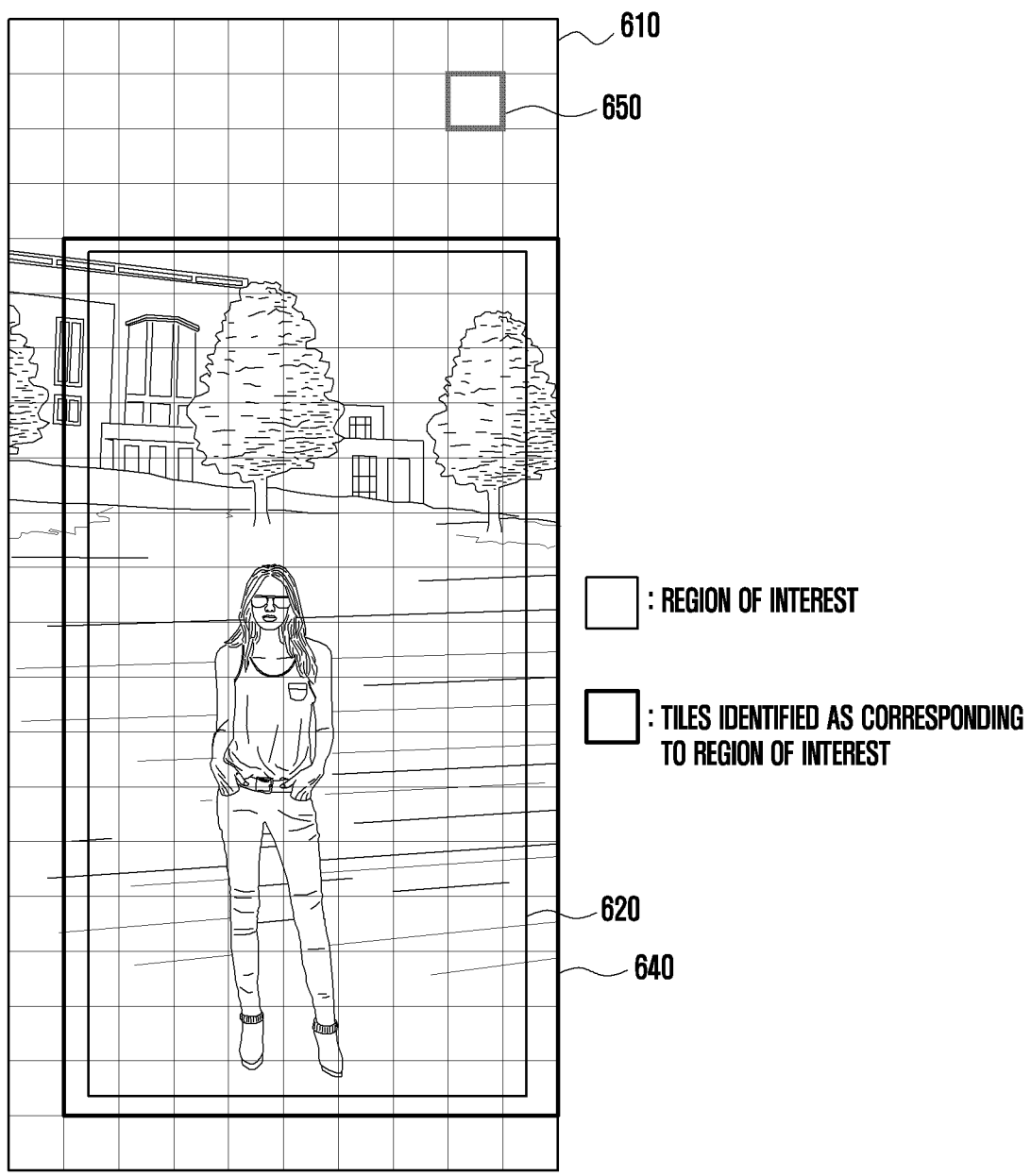

FIGS. 6A to 6C illustrate an example in which the electronic device extracts and stores a region of interest of an image according to an embodiment of the disclosure.

FIG. 6A shows an image 610 selected by using the electronic device 600 (e.g., electronic device 101 in FIG. 1) according to an embodiment of the disclosure. The user may select the image 610 by using an editing application as well as a viewer application, and the electronic device 600 may display the selected image 610. In an embodiment of the disclosure, a region of the image 610 may be selected as a region of interest by a specific action (e.g., zoom-in, or selection of a region by dragging).

FIG. 6B shows a region of the image 610 selected as a region of interest 620 by the electronic device 600 according to an embodiment of the disclosure. In an embodiment of the disclosure, when a region of interest 620 is selected through a specific action, a button 630 for storing the selected region-of-interest 620 may be activated. When the button 630 is selected, the region of interest 620 may be stored as an image file separate from the original image file. Or, when the button 630 is selected, the region of interest and information on the region of interest may replace the corresponding portions of the original image file. Or, when the button 630 is selected, information on the region of interest may be added to the original image file.

FIG. 6C shows the region of interest 620 selected from the image 610 and tiles 640 corresponding to the selected region of interest according to an embodiment of the disclosure.

With reference to FIG. 6C, the image 610 may be represented by a total of 210 (10×21) tiles 650, for example. In an embodiment of the disclosure, the region of interest 620 may be selected in any size, and the whole of a tile may be included in the region of interest 620 or only a portion of a tile may be included in the region of interest 620.

In an embodiment of the disclosure, the electronic device 600 may identify tiles corresponding to the region of interest 620. When at least a part of a tile is included in the region of interest 620, the tile may be identified as a tile 640 corresponding to the region of interest 620. In FIG. 6C, a total of 144 (9×16) tiles 640 may be identified as corresponding to the region of interest.

In an embodiment of the disclosure, when the electronic device 600 makes a selection in units of tiles from the original image file, even if a part of a tile is included in the region of interest 620, the tile may be stored as the region of interest 620. In FIG. 6C, since the total number of tiles identified as corresponding to the region of interest 620 is 144 (9×16), the 144 tiles may be stored as a separate image file. In an embodiment of the disclosure, when a part of a tile is included in the region of interest, the whole tile may be stored in the image file in which the region of interest is stored, but the part of the tile in the region of interest may be separately stored. For example, information on the pixels of the region of interest may be further stored.

In an embodiment of the disclosure, the electronic device 600 may add or update information on the tiles identified as corresponding to the region of interest 620 to the metadata of the original image file. The electronic device 600 may also update the thumbnail image by generating a thumbnail image corresponding to the region of interest.

Figure 7:
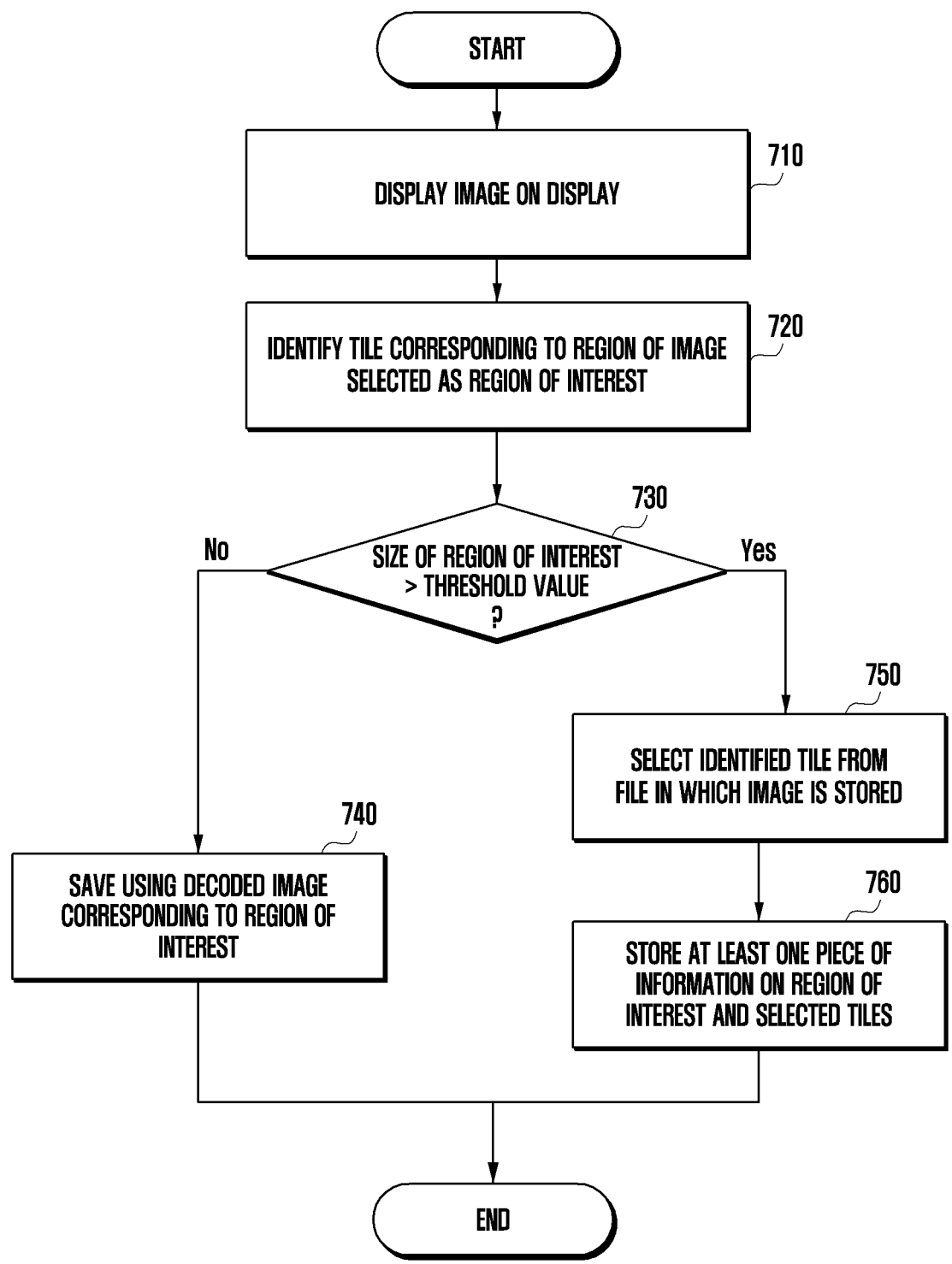
FIG. 7 is a flowchart illustrating operations of the electronic device according to another embodiment of the disclosure.

FIG. 7 is a flowchart illustrating operations of the electronic device according to another embodiment of the disclosure.

In an embodiment of the disclosure, at operation 710, the electronic device (e.g., electronic device 400 in FIG. 4) may display an image on the display part (or, display) (e.g., display part 420 in FIG. 4). The image file containing the image may be a compressed file. The electronic device 400 may additionally perform a decoding operation to display the image file.

In an embodiment of the disclosure, a region of the image may be selected as a region of interest by the electronic device 400 or the user. In the following description, the image before the region of interest is selected may be referred to as an "original image" or an "original image file" to distinguish it from the image selected as the region of interest.

In an embodiment of the disclosure, at operation 720, the electronic device 400 may identify one or more tiles corresponding to the region of the image selected as the region of interest. The electronic device 400 may identify the corresponding tiles by checking coordinate values of pixels corresponding to the region of interest against the coordinate values of the tiles. The electronic device 400 may determine whether a tile is included in part or in whole in the region of interest. If a tile is included in part or in whole in the region of interest, the electronic device 400 may determine that the tile is a tile belonging to the region of interest.

In an embodiment of the disclosure, the electronic device 400 may further identify information such as the indexes of tiles corresponding to the region of interest, the total number of tiles, coordinate values of the tiles, the size of the region of interest, or the total size of tiles corresponding to the region of interest.

In an embodiment of the disclosure, at operation 730, the electronic device 400 may check whether the size of the selected region of interest is greater than a threshold value. According to an embodiment of the disclosure, it may be efficient to store the region of interest in units of tiles only when the region of interest satisfies a specific condition (e.g., size of the region of interest). For example, when the size of a tile constituting the image is large and the region of interest includes only a small number of tiles, storing the region of interest as a plurality of tiles may be inefficient compared to storing the region of interest as a separate whole image.

In an embodiment of the disclosure, as a specific condition, the size of the region of interest may be compared with a threshold value, and the threshold value may be dependent on the size of the tile. Table 1 below shows an example of threshold values according to the size of tile.

TABLE 1

| Size of one tile (unit: pixels) | Threshold value (unit: pixels) |
| --- | --- |
| 64 × 64 | — |
| 128 × 128 | 8M |
| 256 × 256 | 12M |
| 512 × 512 | 24M |

For example, when the size of a tile is 64×64, there may be no corresponding threshold value. When the size of a tile is 64×64, the electronic device 400 may store the region of interest as a plurality of tiles regardless of the size of the region of interest. As another example, when the size of a tile is 128×128, the threshold value may be 8M. If the size of a tile is 128×128, the electronic device 400 may check whether the size of the region of interest is greater than 8M. In addition, the size of the image that is not compressed in tiles may be further considered as a criterion for the threshold value.

In an embodiment of the disclosure, the electronic device 400 may further consider the available memory of the electronic device or the performance of the processor as specific conditions. For example, when the available memory is small, the threshold value may be smaller than that when the available memory is large. In addition, when the processor has high performance, the threshold value may be larger than that when the processor has low performance.

In an embodiment of the disclosure, if the size of the selected region of interest is less than the threshold value, at operation 740, the electronic device 400 may encode the decoded image corresponding to the region of interest (compress with an image codec) and store it as the region of interest.

In an embodiment of the disclosure, if the size of the selected region of interest is greater than the threshold value, at operation 750, the electronic device 400 may select the identified tiles from the file in which the image is stored. The electronic device 400 may select the identified tiles from the file in which the image is stored, that is, the original image file, by using indexes or coordinate values of the tiles corresponding to the region of interest. The electronic device 400 may use information about the tile index or coordinate value and the tile offset from the original image file to select the identified tiles. Information about the offset of the tiles may be included in the metadata (e.g., metadata 220 in FIG. 2) of the original image file.

In an embodiment of the disclosure, at operation 760, the electronic device 400 may store both at least one piece of information on the region of interest and the selected tiles. The electronic device 400 may include at least one piece of information on the region of interest in header data and store it together with the selected tiles. In an embodiment of the disclosure, the electronic device 400 may change some information of the header data of the original image file and store it together with the selected tiles. In another embodiments of the disclosure, the electronic device 400 may add or update at least one piece of information about the identified region of interest and/or at least one piece of information about the tiles corresponding to the identified region of interest to the metadata of the original image file. When at least one piece of information on the region of interest is added or updated to the metadata, the electronic device 400 may also update the thumbnail image in the original image file. In an embodiment of the disclosure, the electronic device 400 may use, as is, the information on the region of interest included in the metadata of the original image file. In an embodiment of the disclosure, the electronic device 400 may inherit the information on the region of interest from the information included in the metadata of the original image file.

Figure 8:
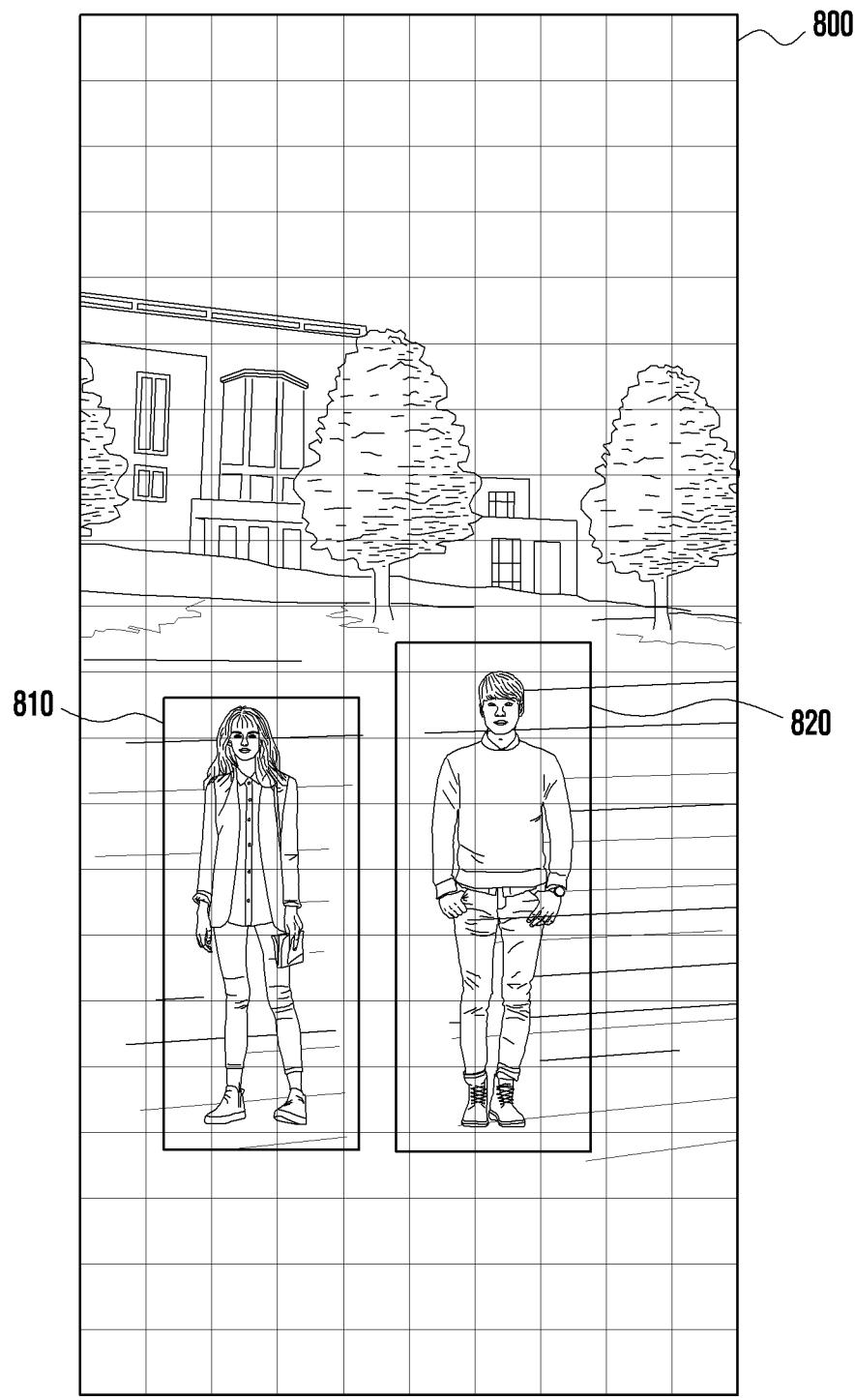
FIG. 8 illustrates an example in which the electronic device edits an image according to an embodiment of the disclosure.

FIG. 8 illustrates an example in which the electronic device edits an image according to an embodiment of the disclosure.

FIG. 8 shows an example of editing an image 800 according to an embodiment of the disclosure. In an embodiment of the disclosure, the tiles identified as the region of interest may be transmitted to an editing application so that the regions of interest 810 and 820 included in the image 800 can be edited. The edited region of interest may replace the corresponding regions in the original image using replacement tiles. For example, the electronic device (e.g., electronic device 400 in FIG. 4) may display the image 800 by using an editing application. The electronic device 400 may select and edit the regions of interest 810 and 820 by using an editing application or editing function. The electronic device 400 may extract and edit only the tiles corresponding to the regions of interest 810 and 820, and may replace the tiles corresponding to the regions of interest 810 and 820 in the original image file.

In an embodiment of the disclosure, the electronic device 400 may perform an editing operation after loading only the region of interest, which is a part of the original image, into the memory without loading the whole of the original image into the memory.

FIG. 9 illustrates a user interface and corresponding functions of the electronic device according to an embodiment of the disclosure.

Parts (a) to (c) of FIG. 9 illustrate a user interface of the electronic device according to an embodiment of the disclosure, and part (d) of FIG. 9 represents image data loaded into the memory according to the use of the user interface.

With reference to part (a) of FIG. 9, in an embodiment of the disclosure, the electronic device 900 may display an image 910 by using a viewer application. The image 910 may be encoded and stored in an image file 930. The electronic device 900 may decode the selected image file 930 to display the image 910 using the viewer application (935). The electronic device 900 may store first image data 940 in the memory (e.g., memory 130 in FIG. 1) for display with the viewer application. The image stored in the image file 930 may have a high resolution, but when the electronic device 900 is small (e.g. a mobile handheld device), the viewer application may display the image at a lower resolution than the native resolution of the stored image. The first image data 940 for display of the low-resolution image may be loaded into the memory 130. In an embodiment of the disclosure, the viewer application may include an edit button 912 linked to an editing application.

In an embodiment of the disclosure, the viewer application and the editing application may be separate applications, or may be a single application supporting various functions (e.g., viewer function and editing function).

In an embodiment of the disclosure, as shown in part (b) of FIG. 9, the electronic device 900 may select a region of interest by identifying a specific action (e.g., selection of a region of interest by zooming in or dragging) in the viewer application. The viewer application may activate a save button 914 when a specific action is identified to select the region of interest. When the save button 914 is selected, the region of interest may be saved as described with reference to FIG. 5A, 5B or 7.

In an embodiment of the disclosure, when the edit button 912 is selected in the electronic device 900, an editing application may be executed as shown in part (c) of FIG. 9. The editing application may display the image in higher resolution than, for example, the viewer application. To display the image by using the editing application, the electronic device 900 may encode and decode the first image data 940 stored in the memory 130 and convert it into second image data 960 (945). Alternatively, the electronic device 900 may decode the image file 930 into the second image data 960 (950). In an embodiment of the disclosure, the second image data 960 may have a higher resolution than the first image data. When the editing application is executed, the electronic device 900 may load the second image data 960 into the memory 130. When the selection button 924 is selected in the editing application, a user interface (e.g., figure for selecting a region) for selecting a region of interest may be added. When a region of interest 925 is selected using the added user interface, the region of interest 925 may be saved using the save button 922. When the save button 922 is selected, the region of interest may be stored as described with reference to FIG. 5A, 5B or 7.

In the above description, image files are used as examples, but the instant disclosure may also be applied to moving image files, i.e., videos. For example, a region of interest may be selected from a moving image file, and tiles and tile information corresponding to the region of interest may be extracted and edited, and the edited result may be saved as a separate file.

According to an embodiment of the disclosure, an electronic device may include: a display; a processor operatively connected to the display; and a memory operatively connected to the processor, wherein the memory may store instructions that, when executed, cause the processor to: display an image on the display; identify tiles corresponding to at least a region of the image selected as a region of interest; select the identified tiles from a file in which the image is stored; and store at least one piece of information on the region of interest and the selected tiles, wherein the file in which the image is stored may be a file in which the image is compressed and stored as a plurality of tiles.

In the electronic device according to an embodiment of the disclosure, the memory may store instructions that further cause the processor to identify, if at least a part of a tile is included in the region of interest, the tile as a tile corresponding to the region of interest.

In the electronic device according to an embodiment of the disclosure, the memory may store instructions that further cause the processor to identify tile indexes corresponding respectively to the upper left and the lower right of the region of interest.

In the electronic device according to an embodiment of the disclosure, the memory may store instructions that further cause the processor to add the at least one piece of information on the region of interest and the selected tiles to metadata of the file in which the image is stored.

In the electronic device according to an embodiment of the disclosure, the at least one piece of information on the region of interest may include information on the number of tiles, indexes of tiles, and/or coordinate values of pixels corresponding to the region of interest.

In the electronic device according to an embodiment of the disclosure, the memory may store instructions that further cause the processor to: store the at least one piece of information on the region of interest and the selected tiles in another image file different from the file in which the image is stored; and add at least some of information included in the metadata of the file in which the image is stored to the other image file.

In the electronic device according to an embodiment of the disclosure, the memory may store instructions that further cause the processor to update, when the region of interest is edited, tiles corresponding to the region of interest in the file in which the image is stored.

According to an embodiment of the disclosure, an electronic device may include: a display; and a processor operatively connected to the display, wherein the processor may be configured to: display an image on the display; identify tiles corresponding to at least a region of the image selected as a region of interest; identify the size of the region of interest based on the identified tiles; determine whether the size of the region of interest is greater than a preset threshold value; and store, if the size of the region of interest is less than the preset threshold value, the region of interest by using a decoded image corresponding to the region of interest.

In the electronic device according to an embodiment of the disclosure, the processor may be further configured to: select, if the size of the region of interest is greater than the preset threshold value, the identified tiles from a file in which the image is stored; and store at least one piece of information on the region of interest and the selected tiles, wherein the file in which the image is stored may be a file in which the image is compressed and stored as a plurality of tiles.

In the electronic device according to an embodiment of the disclosure, the threshold value may be determined based on the size of a tile, the size of the available memory, and/or the performance of the processor.

In the electronic device according to an embodiment of the disclosure, the processor may be further configured to identify, if at least a part of a tile is included in the region of interest, the tile as a tile corresponding to the region of interest.

In the electronic device according to an embodiment of the disclosure, the processor may be further configured to identify tile indexes corresponding respectively to the upper left and the lower right of the region of interest.

In the electronic device according to an embodiment of the disclosure, the processor may be further configured to add at least one piece of information about the region of interest to the file in which the image is stored.

According to an embodiment of the disclosure, a method for an electronic device to store a region of interest of an image may include: displaying the image on a display; identifying tiles corresponding to at least a region of the image selected as a region of interest; selecting the identified tiles from a file in which the image is stored; and storing at least one piece of information on the region of interest, and the selected tiles, wherein the file in which the image is stored may be a file in which the image is compressed and stored as a plurality of tiles.

In the method for the electronic device to store a region of interest according to an embodiment of the disclosure, identifying tiles corresponding to the region of interest may include identifying, if at least a part of a tile is included in the region of interest, the tile as a tile corresponding to the region of interest.

In the method for the electronic device to store a region of interest according to an embodiment of the disclosure, identifying tiles corresponding to the region of interest may include identifying tile indexes corresponding respectively to the upper left and the lower right of the region of interest.

In the method for the electronic device to store a region of interest according to an embodiment of the disclosure, the method may further include adding the at least one piece of information on the region of interest and the selected tiles to metadata of the file in which the image is stored.

In the method for the electronic device to store a region of interest according to an embodiment of the disclosure, the at least one piece of information on the region of interest may include information on the number of tiles, indexes of tiles, and/or coordinate values of pixels corresponding to the region of interest.

In the method for the electronic device to store a region of interest according to an embodiment of the disclosure, storing the at least one piece of information and the selected tiles may include: storing the at least one piece of information on the region of interest and the selected tiles in another image file different from the file in which the image is stored; and adding at least some of information included in the metadata of the file in which the image is stored to the other image file.

The method for the electronic device to store a region of interest according to an embodiment of the disclosure may further include: editing the region of interest; and updating tiles corresponding to the region of interest in the file in which the image is stored.

It is possible to provide various other embodiments.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
a display;
a processor operatively connected to the display; and
a memory operatively connected to the processor,
wherein the memory stores instructions that, when executed, cause the processor to:
display an image on the display;
identify tiles at least part of which are included in a region of the image selected as a region of interest;
select the identified tiles from an original image file in which the image is stored;
add at least one piece of information on the region of interest and at least one piece of information on the selected tiles to metadata of the original image file; and
update a thumbnail image of the original image file, wherein the original image file is a file in which the image is compressed and stored in units of tiles.

2. The electronic device of claim 1, wherein the memory stores instructions that further cause the processor to identify, in case that at least a part of a tile is included in the region of interest, the tile as a tile corresponding to the region of interest.

3. The electronic device of claim 1, wherein the memory stores instructions that further cause the processor to identify tile indexes corresponding respectively to an upper left and a lower right of the region of interest.

4. The electronic device of claim 1, wherein the at least one piece of information on the region of interest includes information on a number of tiles, indexes of tiles, and/or coordinate values of pixels corresponding to the region of interest.

5. The electronic device of claim 1, wherein the memory stores instructions that further cause the processor to:
store the at least one piece of information on the region of interest and the selected tiles in another image file different from the original image file; and
add at least some of information included in the metadata of the original image file to the other image file.

6. The electronic device of claim 1, wherein the memory stores instructions that further cause the processor to update, when the region of interest is edited, tiles corresponding to the region of interest in the original image file.

7. An electronic device comprising:
a display; and
a processor operatively connected to the display,
wherein the processor is configured to:
display an image on the display;
identify tiles corresponding to at least a region of the image selected as a region of interest;
identify a size of the region of interest based on the identified tiles;
determine whether the size of the region of interest is greater than a preset threshold value; and
store, in case that the size of the region of interest is less than the preset threshold value, the region of interest by using a decoded image corresponding to the region of interest.

8. The electronic device of claim 7, wherein the processor is further configured to:
select, in case that the size of the region of interest is greater than the preset threshold value, the identified tiles from a file in which the image is stored; and
store at least one piece of information on the region of interest and the selected tiles,
wherein the file in which the image is stored is a file in which the image is compressed and stored as a plurality of tiles.

9. The electronic device of claim 7, wherein the threshold value is determined based on a size of a tile, a size of available memory, and/or performance of the processor.

10. The electronic device of claim 7, wherein the processor is further configured to identify, in case that at least a part of a tile is included in the region of interest, the tile as a tile corresponding to the region of interest.

11. The electronic device of claim 7, wherein the processor is further configured to identify tile indexes corresponding respectively to an upper left and a lower right of the region of interest.

12. The electronic device of claim 7, wherein the processor is further configured to add at least one piece of information about the region of interest to a file in which the image is stored.

13. A method for storing a region of interest of an image, the method comprising:
displaying the image on a display;
identifying tiles at least part of which are included in a region of the image selected as the region of interest;
selecting the identified tiles from an original image file in which the image is stored;
adding at least one piece of information on the region of interest and at least one piece of information on the selected tiles to metadata of the original image file; and
updating a thumbnail image of the original image file,
wherein the original image file is stored is a file in which the image is compressed and stored in units of tiles.

14. The method of claim 13, wherein identifying tiles corresponding to the region of interest further comprises identifying, in case that at least a part of a tile is included in the region of interest, the tile as a tile corresponding to the region of interest.

15. The method of claim 14, wherein identifying tiles corresponding to the region of interest further comprises identifying tile indexes corresponding respectively to an upper left and a lower right of the region of interest.

16. The method of claim 13, wherein the at least one piece of information on the region of interest includes information on a number of tiles, indexes of tiles, and/or coordinate values of pixels corresponding to the region of interest.

17. The method of claim 13, wherein storing the at least one piece of information and the selected tiles further comprises:
storing the at least one piece of information on the region of interest and the selected tiles in another image file different from the original image file; and
adding at least some of information included in the metadata of the original image file to the other image file.

18. The method of claim 13, further comprising:
editing the region of interest; and
updating tiles corresponding to the region of interest in the original image file.

* * * * *